June 16, 1925.
C. F. CHRISTOPHER
MOTOR
Filed Aug. 29, 1924   2 Sheets-Sheet 1
1,541,900
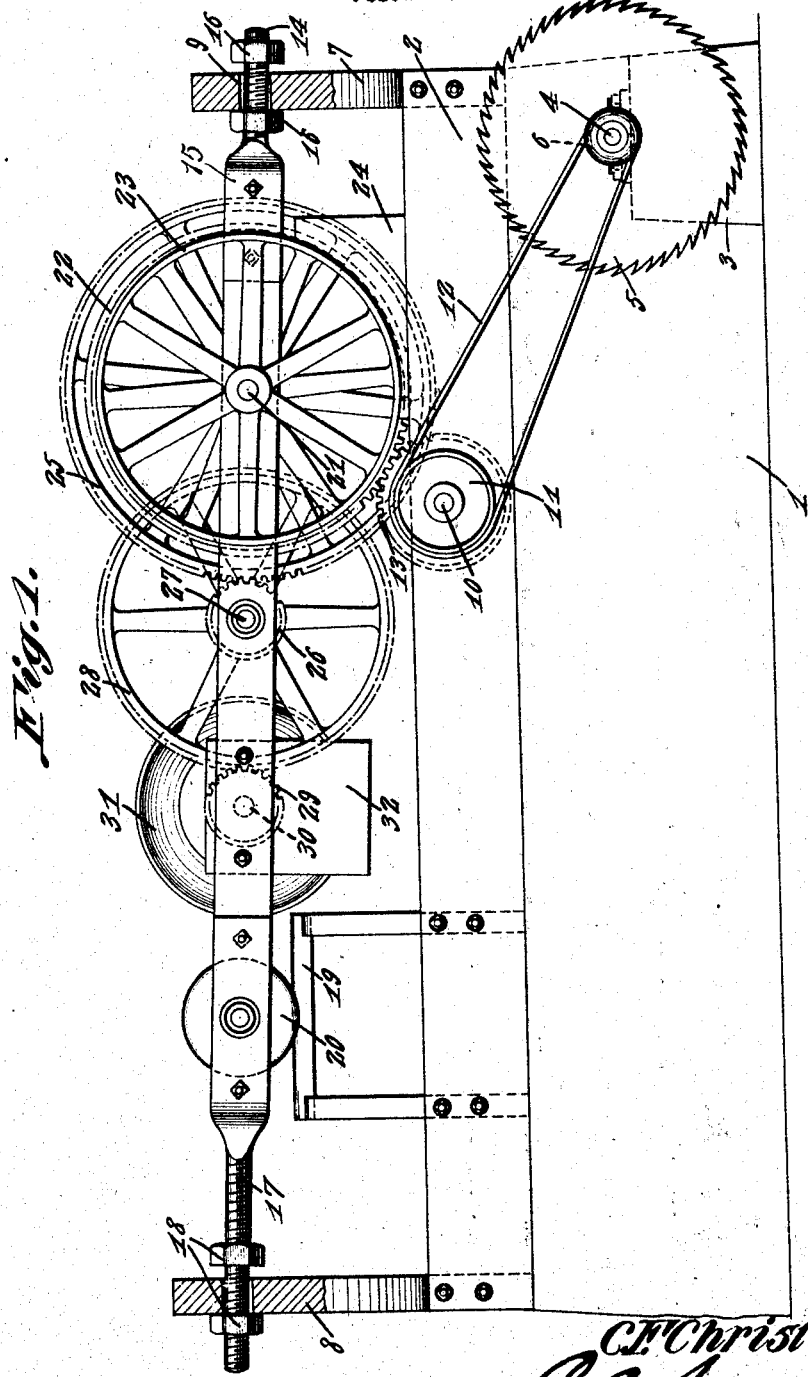
Inventor
C.F.Christopher,
By C.A.Snow & Co.
Attorneys June 16, 1925.  1,541,900
C. F. CHRISTOPHER
MOTOR
Filed Aug. 29, 1924   2 Sheets-Sheet 2
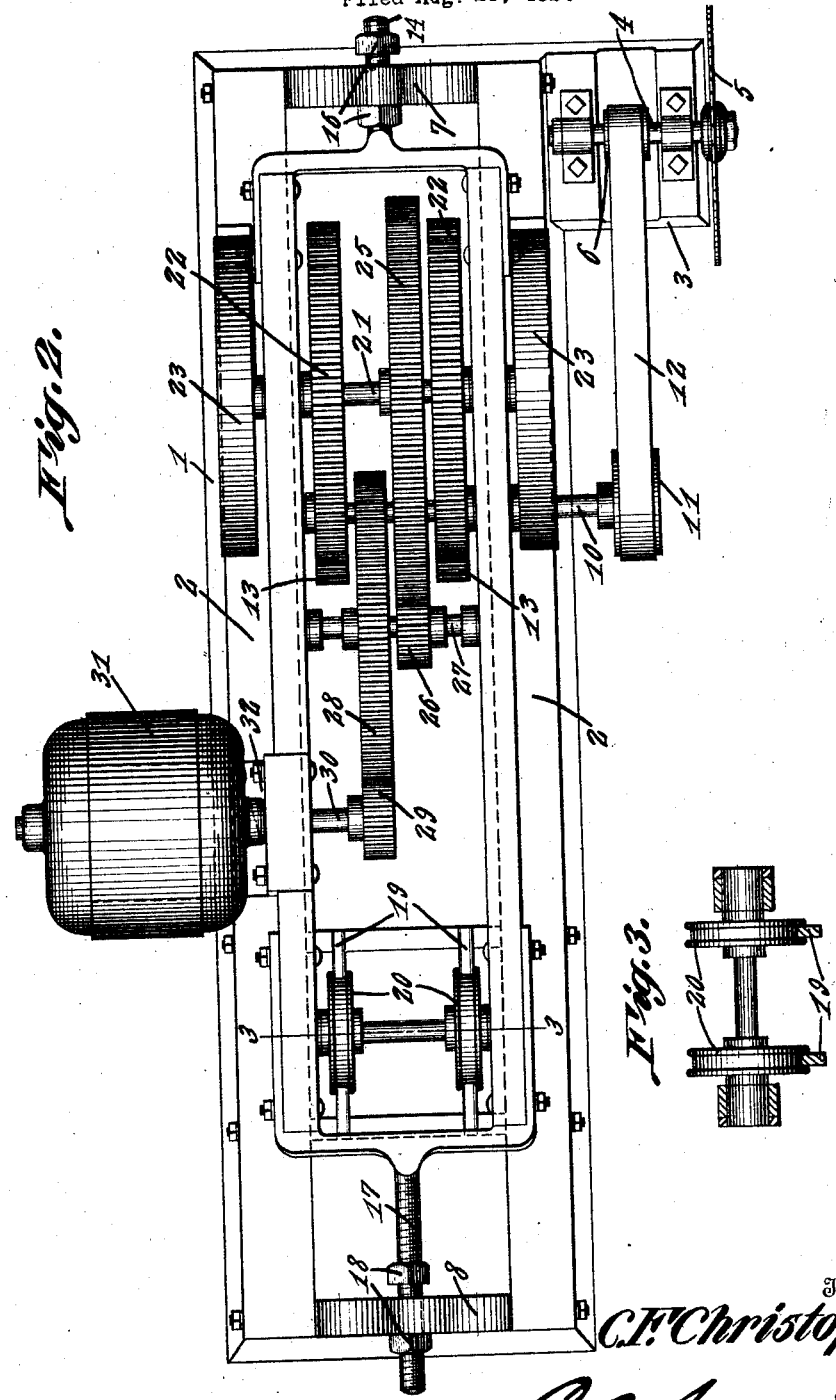
Inventor
C. F. Christopher,
By C. A. Snow & Co.
Attorney.

Patented June 16, 1925.

1,541,900

UNITED STATES PATENT OFFICE.

CALVIN F. CHRISTOPHER, OF CANTON, NORTH CAROLINA.

MOTOR.

Application filed August 29, 1924. Serial No. 735,020.

*To all whom it may concern:*

Be it known that I, CALVIN F. CHRISTOPHER, a citizen of the United States, residing at Canton, in the county of Haywood and State of North Carolina, have invented a new and useful Motor, of which the following is a specification.

This invention relates to a motor and more particularly to a means for transmitting motion from the prime mover to the driven element whereby starting of the driven element can be more effectually accomplished than heretofore and whereby as the resistance to the movement of the driven member increases, the power transmitting mechanism will exert an increasing driving force.

With the foregoing and other objects in view which will appear as the description proceeds, the invention resides in the combination and arrangement of parts and in the details of construction hereinafter described and claimed, it being understood that changes in the precise embodiment of the invention herein disclosed may be made within the scope of what is claimed without departing from the spirit of the invention.

In the accompanying drawings the preferred form of the invention has been shown. In said drawings—

Figure 1 is a side elevation of the structure constituting the present invention, portions thereof being broken away.

Fig. 2 is a plan view.

Fig. 3 is a section on line 3—3, Fig. 2.

Referring to the figures by characters of reference 1 designates the bed of the machine, the same preferably including parallel spaced beams 2. Extended laterally from the bed at one end is a bearing block 3 on which is journaled the shaft 4 of a saw 5 or other driven element, this shaft, in the present instance, being provided with a pulley 6. Projecting from the end portions of the bed between the beams 2 are standards 7 and 8 each of which has an opening 9 therein. A transverse shaft 10 is journaled in the beams 2 and is provided with a pulley 11 for transmitting motion through a belt 12 to the pulley 4. Spaced gears 13 are secured to the shaft 10 at points between the beams 2.

Extending loosely through the opening 9 is a threaded stem 14 projecting from the center of one end of an elongated frame 15, this stud being provided with nuts 16 or the like whereby the movement of the stud within the opening can be regulated. The other end of the frame 15 has a threaded stud or stem 17 projecting through the center thereof through the opening in the standard 8 and nuts 18 are mounted on the stem for the purpose of limiting the longitudinal movement of the stem relative to the standard although permitting relative up and down movement.

A short track 19 is mounted on the beams 2 beneath one end portion of the frame 15 and is engaged by wheels 20 journaled in one end portion of the frame. Thus one end of the frame is properly supported. The other end of this frame has a transverse shaft 21 journaled therein and secured to this shaft at points between the sides of the frame are gears 22 which engage and bear downwardly upon gears 13. To the ends of the shaft 21 are secured wheels 23 and these wheels normally bear downwardly upon stationary shoes 24 mounted on the beams 2. These shoes thus constitute supports for the wheels 23 and for the adjacent end portion of the frame 5. The wheel engaging faces of the shoes are concaved and while the shoes will not allow the frame 15 to move longitudinally in one direction while the wheels are in engagement with the shoes, they will, nevertheless, allow the frame to move in the opposite direction and upwardly, as when the gears 22 are climbing the gears 13 as hereinafter explained.

Secured to the shaft 21 at points between the gears 22 is a driving gear 25 constantly in mesh with a small gear 26 secured to a transverse shaft 27. This shaft is journaled in the sides of the frame 15 and carries a larger gear 28. A small gear 29 meshes with gear 28 and is secured to the shaft 30 of a prime mover 31 which can be in the form of an electric motor or other suitable driving element. This prime mover is mounted on a bracket 32 extended laterally from the frame 15.

When the mechanism is started motion will be transmitted from the prime mover through the train of gears 29, 28, 26 and 25 to the shaft 21 and this will cause the gears 22 to ride up on the gears 13 so that wheels 23 will be moved away from the shoes 24, thereby allowing the mechanism to operate freely. Should the saw be relieved of its load the wheels would promptly gravitate toward and in contact with the shoes 24 and thus prevent the motor from racing. Thus it will be seen that the mechanism constitutes an efficient governor. During the bodily movement of the wheels 23 and the parts connected thereto the wheels 20 will be properly guided along the track rails 19. When the frame 15 is at rest its wheels 23 will bear upon the shoes 24 and thus properly support the frame 15 as shown in Fig. 1.

What is claimed is:—

1. The combination with a shaft, gears thereon, and an element driven by said shaft, of supporting shoes, a movable frame, a transverse shaft journaled in the frame, wheels secured thereto and normally bearing upon the shoes to support one end portion of the frame, driving gears secured to the shaft and normally engaging the first named gears, movable supports for the other end portion of the frame, a motor carried by the frame, and means for transmitting motion from the motor to the driving gears.

2. The combination with a shaft, a driven element actuated thereby, and gears secured to and rotatable with the shaft, of a movably supported frame, fixedly mounted shoes thereunder, a transverse shaft journaled in the frame, wheels secured to the shaft and normally engaging the shoes to support one end portion of the frame, movable supports for the other end portion of the frame, a motor carried by the frame, means supported by the frame for transmitting motion from the motor to the driving gears, and cooperating fixed and movable means for limiting the movement of the frame relative to the shoes.

3. The combination with gears, a driven element, and means for transmitting motion to said element from the gears, of spaced standards, a frame movably mounted relative thereto, rotatable wheels connected to the frame, shoes normally engaged by the wheels to support one end of the frame, means for movably supporting the other end of the frame, a motor carried by the frame, and means for transmitting motion from the motor to the gears, said means including driving gears meshing with the first named gears and adapted to rise upwardly thereon when subjected to excessive resistance from the driven element.

4. The combination with gears, a driven element, and means for transmitting motion to said element from the gears, of spaced standards, a frame movably mounted relative thereto, rotatable wheels connected to the frame, shoes normally engaged by the wheels to support one end of the frame, means for movably supporting the other end of the frame, a motor carried by the frame, and means for transmitting motion from the motor to the gears, said means including driving gears meshing with the first named gears and adapted to rise upwardly thereon when subjected to excessive resistance from the driven element, and adjustable means cooperating with the standard for limiting the movement of the frame relative to the standards and shoes.

In testimony that I claim the foregoing as my own, I have hereto affixed my signature in the presence of two witnesses.

CALVIN F. CHRISTOPHER.

Witnesses:
C. E. BROWN,
LENA WRIGHT.